(12) United States Patent
Woudenberg

(10) Patent No.: US 11,401,282 B2
(45) Date of Patent: Aug. 2, 2022

(54) METHOD FOR STORING AND/OR TRANSPORTING GALLIUM CHLORIDE

(71) Applicant: NOURYON CHEMICALS INTERNATIONAL B.V., Arnhem (NL)

(72) Inventor: Richard Herman Woudenberg, Diepenveen (NL)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 16/759,764

(22) PCT Filed: Oct. 26, 2018

(86) PCT No.: PCT/EP2018/079375
§ 371 (c)(1),
(2) Date: Apr. 28, 2020

(87) PCT Pub. No.: WO2019/086336
PCT Pub. Date: May 9, 2019

(65) Prior Publication Data
US 2020/0325158 A1   Oct. 15, 2020

(30) Foreign Application Priority Data
Oct. 31, 2017 (EP) ..................... 17199375

(51) Int. Cl.
*C07F 5/00* (2006.01)
*C01G 15/00* (2006.01)

(52) U.S. Cl.
CPC ............... *C07F 5/00* (2013.01); *C01G 15/00* (2013.01)

(58) Field of Classification Search
CPC .................................. C07F 5/00; C01G 15/00
See application file for complete search history.

(56) References Cited

U.S. PATENT DOCUMENTS

| | | | |
|---|---|---|---|
| 3,103,526 A | 9/1963 | Jenkner et al. | |
| 3,318,931 A | 5/1967 | Dotzer et al. | |
| 5,043,462 A * | 8/1991 | Sundermeyer | C07F 5/00 556/1 |
| 6,495,707 B1 * | 12/2002 | Leese | C07F 5/00 422/129 |
| 6,867,315 B2 * | 3/2005 | Honma | C07F 5/00 556/1 |
| 8,513,447 B1 * | 8/2013 | Maggiarosa | C07F 5/00 556/1 |
| 8,969,608 B2 * | 3/2015 | Modtland | C07F 7/003 556/51 |
| 9,108,985 B2 * | 8/2015 | Karch | C23C 16/18 |
| 10,160,774 B2 * | 12/2018 | Caipa Campos | C07F 5/00 |
| 2004/0122248 A1 * | 6/2004 | Shenai-Khatkhate | C07F 5/00 556/7 |
| 2006/0047132 A1 * | 3/2006 | Shenai-Khatkhate | C07F 5/062 556/1 |
| 2013/0197252 A1 * | 8/2013 | Maggiarosa | C07F 5/00 556/1 |
| 2014/0256974 A1 * | 9/2014 | Karch | C23C 16/301 556/1 |
| 2017/0081344 A1 * | 3/2017 | Schorn | C07F 5/00 |
| 2020/0207786 A1 * | 7/2020 | Caipa Campos | C07F 5/00 |

FOREIGN PATENT DOCUMENTS

| | | | |
|---|---|---|---|
| CN | 1872862 A | * 12/2006 | |
| DE | 4005726 A1 | 10/1990 | |
| JP | 50053331 A | 5/1975 | |
| JP | S62153293 A | 7/1987 | |
| JP | 2006265168 A | 10/2006 | |
| JP | 2006342101 A | * 12/2006 | |
| JP | 2009126835 A | * 6/2009 | |
| JP | 2010195690 A | * 9/2010 | |
| JP | 2016029026 A | * 3/2016 | |
| JP | 2016056160 A | * 4/2016 | |
| KR | 20140099862 A | 8/2014 | |
| PL | 166723 B1 | * 6/1995 | |
| WO | 2013083450 A1 | 6/2013 | |
| WO | WO-2019115377 A1 | * 6/2019 | ............. C07F 5/064 |

OTHER PUBLICATIONS

K. Starowieyski, 14 Applied Organometallic Chemistry, 616-622 (2000) (Year: 2000).*
CASREACT Abstract and Indexed Reactions, K. Starowieyski et al., PL 166723 (1995) (Year: 1995).*
CASREACT Abstract and Indexed Reaction, T. Honma et al., U.S. Pat. No. 6,867,315 (2005) (Year: 2005).*
English Translation of Starowieyski PL 166723 (1995) (Year: 1995).*
EPO, European Extended Search Report issued in European Application No. 17199375.1, dated Apr. 11, 2018.
EPO, International Search Report issued in International Application No. PCT/EP2018/079375, dated Jan. 14, 2019.
A. M. Kut'in et al., "Alkylation Reactions of Gallium and Indium Halides", Journal of General Chemistry of the USSR, vol. 47, No. 12, Part 2, Dec. 1977, pp. 2769-2773.
John J. Eisch, "Organometallic Compounds of Group 111. I. The Preparation of Gallium and Indium Alkyls from Organoaluminum Compounds", Journal of The American Chemical Society, vol. 84, No. 19, Oct. 17, 1962, pp. 3605-3610.

* cited by examiner

*Primary Examiner* — Alexander R Pagano
(74) *Attorney, Agent, or Firm* — Lorenz & Kopf, LLP

(57) ABSTRACT

Method for storing and/or transporting $GaCl_3$ involving the step of adding an aluminium compounds of the formula $R_{3-x}AlCl_x$, wherein R is a linear or branched alkyl group with 1-8 carbon atoms and x is 0 or 1, to said $GaCl_3$ in an Al/Ga molar ratio of at least 0.2, thereby forming a liquid formulation, followed by introducing said liquid formulation in a container.

20 Claims, No Drawings

METHOD FOR STORING AND/OR TRANSPORTING GALLIUM CHLORIDE

CROSS-REFERENCE TO RELATED APPLICATION

This application is a U.S. National-Stage entry under 35 U.S.C. § 371 based on International Application No. PCT/EP2018/079375, filed Oct. 26, 2018, which was published under PCT Article 21(2) and which claims priority to European Application No. 17199375.1, filed Oct. 31, 2017, which are all hereby incorporated in their entirety by reference.

TECHNICAL FIELD

The present invention relates to a method for storing and/or transporting gallium trichloride and the application of said stored and/or transported gallium trichloride for the preparation of trialkyl gallium compounds.

BACKGROUND

With the advancement of mobile phones and optical communication technologies, demand is rapidly growing for compound semiconductors for use in high speed electronic devices such as high electron mobility transistors (HEMTs), heterojunction bipolar transistors (HBTs), semiconductor lasers, optical devices such as white and blue super high-intensity LEDs, and other applications.

In general, alkyl derivatives of group 12 and group 13 metals, and in particular the methyl or ethyl derivatives, are often used as metalorganic precursors for compound semiconductors. A great demand exists for, in particular, trimethyl gallium for the production of compound semiconductors by MOCVD with group 15 elements, such as nitrogen, arsenic, and the like.

Trialkyl gallium, such as trimethyl gallium (TMG) and triethyl gallium (TEG), is conventionally prepared by reacting gallium trichloride with a trialkyl aluminium compound:

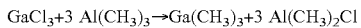

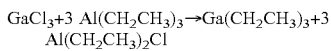

Gallium trichloride is solid at room temperature—it's melting point is 78° C.—and hygroscopic. In view of this hygroscopic properties and also in view of its intended addition to water- and air-sensitive materials like trialkyl aluminium, air has to be excluded from GaCl3, both during storage and transportation, and during introduction into a trialkyl aluminium-containing reactor.

This is only practically possible by introducing GaCl3 in liquid form into a storage container. Given its melting point, this requires first heating the GaCl3 above said melting point, introducing the liquid GaCl3 into the container, and cooling down again.

After reaching its destination and upon use of the GaCl3 as a reactant, the GaCl3 inside the container has to be heated above its melting point again, so that it can be dosed to a reactor in liquid form. This is all rather cumbersome.

Furthermore, GaCl3 is very corrosive, which means that the container has to be made of special material, such a hasteloy-type alloys. This makes transport and storage of GaCl3 rather expensive.

SUMMARY

It has now been found that the addition of a certain amount of an aluminium compound, for instance triethyl-aluminium (TEAL), to GaCl$_3$ results in a reaction causing GaCl$_3$ to dissolve and be liquid at room temperature:

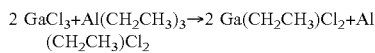

As shown in the experimental section below, this also works for aluminium compounds other than TEAL.

The resulting liquid reaction product can then be introduced into a container and dosed to a reactor with ease and without requiring heating and cooling steps.

In addition, the resulting liquid product is not corrosive (it does not form HCl when contacted with traces of water of oxygen), which allows transportation in less expensive containers.

DESCRIPTION

The present invention therefore relates to a method for storing and/or transporting GaCl3 by adding an aluminium compound of the formula $R_{3-x}AlCl_x$, wherein R is a linear or branched alkyl group with 1-8 carbon atoms and x is 0 or 1, to said GaCl$_3$ in an Al/Ga molar ratio of at least 0.2, thereby forming a liquid formulation, followed by introducing said liquid formulation in a container.

The Al/Ga molar ratio is at least 0.2, meaning that molar ratio the Ga:Al ratio at most 5:1. Preferably, the Al/Ga molar ratio is at least 0.3.

The Al/Ga molar ratio is preferably not higher than 10, more preferably not higher than 5, and most preferably not higher than 1.

The reaction between GaCl3 and the aluminium compound is exothermal, meaning that cooling may be required during the formation of the liquid formulation.

The aluminium compound has the formula R3-xAlClx, wherein R is a linear or branched alkyl group with 1-8, preferably 1-4, and most preferably 2 carbon atoms. Ethyl groups are preferred in view of the price and availability of the corresponding aluminium compounds and in view of the melting points of the resulting gallium compounds.

The value of x is either 0 or 1. If x=0, the aluminium compound is a trialkyl aluminium. The trialkyl aluminium is preferably selected from the group consisting of trimethyl aluminium (TMAL), triethyl aluminium (TEAL), and tri(n-buyl)aluminium (TNBAL).

If x=1, the aluminium compound is a dialkyl aluminium chloride, preferably diethyl aluminium choride (DEAC).

The resulting liquid formulation comprises gallium alkyl dichloride (GaRCl2) and alkyl aluminium dichloride (RAlCl2), wherein R is a linear or branched alkyl group with 1-8, preferably 1-4, and most preferably 2 carbon atoms. Hence, most preferably, the liquid formulation comprises gallium ethyl dichloride (GaEtCl2) and ethyl aluminium dichloride (EtAlCl2).

The present invention therefore also relates to a formulation comprising gallium alkyl dichloride (GaRCl2) and alkyl aluminium dichloride (RAlCl2), most preferably gallium ethyl dichloride (GaEtCl2) and ethyl aluminium dichloride (EtAlCl2).

The gallium alkyl dichloride (GaRCl2) content of the liquid formulation is preferably at least 33 mol % and most preferably at least 50 mol %, based on the total liquid formulation. It is preferably at most 90 mol %, more preferably at most 75 mol %, and most preferably at most 66 mol %.

The liquid formulation further contains alkyl aluminium dichloride (RAlCl2) and optionally dissolved GaCl3, the amounts depending on the Al/Ga molar ratio used to prepare the liquid formulation.

In a preferred embodiment, the liquid formulation consists of GaRCl2, RAlCl2, and optionally GaCl3.

The liquid formulation can suitably be used for the production of a trialkyl gallium (GaR'3), comprising the steps of (i) transporting a container comprising the liquid formulation to a reactor, (ii) introducing the liquid formulation into said reactor, and (iii) reacting the liquid formulation with a trialkyl aluminium compound AlR'3 to form trialkyl gallium GaR'3 and dialkyl aluminium chloride Al(R')2Cl.

R' is a linear or branched alkyl group with 1 to 8 carbon atoms.

In one embodiment, R' is selected from the group consisting of methyl, ethyl, and linear or branched propyl and butyl groups (including n-propyl, isopropyl, n-butyl, isobutyl, and tert-butyl). R' is most preferably methyl.

In another embodiment, the process involves the preparation of trimethyl gallium (TMG) by (i) transporting a container comprising the liquid formulation to a reactor, (ii) introducing the liquid formulation into said reactor, (iii) reacting the liquid formulation and a trialkyl aluminium compound AlR"3 to form a trialkyl gallium GaR"3 and dialkyl aluminium chloride Al(R")2Cl, and subsequently reacting said trialkyl gallium GaR"$_3$ in a step (iv) with either trimethyl aluminium [Al(CH$_3$)$_3$] or dimethylaluminium chloride [Al(CH$_3$)$_2$Cl] to form said trimethyl gallium, wherein R" is a linear or branched alkyl group with 2 to 8 carbon atoms, preferably ethyl or linear or branched propyl and butyl groups (including n-propyl, isopropyl, n-butyl, isobutyl, and tert-butyl), more preferably ethyl, n-propyl, n-butyl, and isobutyl, and most preferably ethyl.

The advantage of this embodiment is that per mole TMG either none or only one mole of the expensive TMAL is required, whereas conventional processes for the production of TMG require three moles of TMAL per mole of TMG.

Furthermore, any trialkyl aluminium compound AlR"3 that is formed as a side-product can be re-cycled to step (i).

Step (iii) in the above processes is preferably conducted under inert (e.g. nitrogen) atmosphere at a temperature in the range 0-280° C., preferably 25-250° C., most preferably 50-175° C.

The temperature can be kept constant during the reaction, but may also gradually rise.

The liquid formulation according to the present invention and the other reagents can be introduced into a reaction vessel or a distillation column, under inert gas atmosphere. The reagents can be added in any form and in any order.

In one embodiment, the liquid formulation according to the present invention and the trialkyl aluminium compound can be introduced in a distillation column, either separately or as a pre-mix. Defining the bottom of the distillation column as positon 0 and the top of the distillation column as position 1, the liquid formulation is preferably dosed to said column at a position between 0.1 and 0.9, more preferably between 0.25 and 0.75, even more preferably between 0.25 and 0.50, and most preferably between 0.25 and 0.40.

The reaction of step (iv) can be carried out by introducing the trialkyl gallium GaR"3, either dimethyl aluminium chloride (Al(CH3)2Cl) or trimethyl aluminium (TMAL), and optionally a solvent into a reaction vessel or distillation column under inert gas atmosphere. These compounds can be added in any form and in any order.

In a preferred embodiment, the trialkyl gallium GaR"3 obtained in step (iii) is introduced in a distillation column. The dimethyl aluminium chloride (Al(CH3)2Cl) or trimethyl aluminium (TMAL) can also be introduced into the distillation column, but can also added to the re-boiler.

Defining the bottom of the distillation column as positon 0 and the top of the distillation column as position 1, the liquid formulation is/are preferably dosed to said column at a position between 0.1 and 0.9, more preferably between 0.25 and 0.75, even more preferably between 0.25 and 0.50, and most preferably between 0.25 and 0.40.

In a further embodiment, step (iii) and step (iv) are each conducted in a distillation column, said columns being connected in series.

In an alternative embodiment, both step (iii) and step (iv) are performed in one single reactor (one pot reaction) by adding the required amounts of liquid formulation, trialkyl aluminium AlR"3, and trimethyl aluminium or dimethyl aluminum chloride to a reactor and isolating the produced TMG by distillation or crystallisation.

Examples of suitable solvents are saturated aliphatic hydrocarbons like pentane, hexane, heptane, octane, nonane, decane, undecane, and dodecane; saturated alicyclic hydrocarbons like cyclohexane and cycloheptane; and aromatic hydrocarbons like toluene, xylene, trimethylbenzene, ethylbenzene, ethyltoluene, and indene. Preferred solvents are those that are easily separable from the resulting trimethyl gallium, more preferably by having a boiling point that differs significantly from that of trimethyl gallium.

The trialkyl gallium obtained by the process of the present invention can be suitably used for the preparation of semiconductor devices, e.g. gallium nitride-based semiconductors.

EXAMPLES

Example 1

To gallium trichloride (3.49 gram, 0.020 mol) was slowly added—drop by drop—triethyl aluminum (1.14 gram, 0.010 mol). The molar ratio GaCl$_3$:TEAL was 2:1 (the Al/Ga molar ratio was therefore 0.5).

Reaction heat was produced. After the addition, the reaction mixture was cooled down to room temperature.

A clear colorless liquid was obtained which contained—as analysed with 1H-NMR—66 mol % GaEtCl2 and 33 mol % AlEtCl$_2$.

Example 2

Example 1 was repeated, except that 5.29 gram (0.030 mol) gallium trichloride was used, resulting in a molar ratio GaCl$_3$:TEAL of 3:1 (the Al/Ga molar ratio was therefore 0.33).

A clear colorless liquid was obtained which contained 50 mol % GaEtCl$_2$, 25 mol % AlEtCl$_2$, and 25 mol % dissolved GaCl$_3$.

Example 3

Example 1 was repeated, except that 3.51 gram (0.020 mol) gallium trichloride and 1.99 gram (0.010 mol) tri(n-butyl) aluminum (TNBAL) was used, resulting in a molar ratio GaCl$_3$:TNBAL of 3:1 (the Al/Ga molar ratio was therefore 0.33).

A clear colorless liquid was obtained which contained 50 mol % Ga(n-Bu)Cl$_2$, 25 mol % Al(n-Bu)Cl$_2$, and 25 mol % dissolved GaCl$_3$.

Example 4

Example 1 was repeated, except that 3.53 gram (0.020 mol) gallium trichloride and 2.42 gram (0.020 mol) diethylaluminum chloride (DEAC) was used, resulting in a molar ratio GaCl3:DEAC of 1:1 (the Al/Ga molar ratio was therefore 1).

A clear colorless liquid was obtained which contained 50 mol % GaEtCl$_2$ and 50 mol % AlEtCl$_2$.

Example 5

Gallium chloride (17.60 gram, 0.10 mol) was added to a 50 ml two neck flask equipped with a distillation column, stirrer and thermocouple.

Triethylaluminum (5.72 gram, 0.05 mol) was slowly added to the solid gallium chloride. A colorless liquid was obtained. After cooling down to room temperature, the reaction mixture remained a colorless liquid containing 66 mol % GaEtCl2 and 33 mol % AlEtCl2.

Trimethylaluminium (18.1 gram, 0.25 mol) was slowly added to said colorless liquid.

After the addition, the reaction mixture was gradually heated to 160° C. and the distillate was collected in a receiving flask. Trimethyl gallium was isolated in 85% yield (9.76 gram, 0.085 mol). This yield is comparable to a yield obtained by reacting trimethyl aluminium with solid gallium chloride.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. A method for storing and/or transporting GaCl$_3$, comprising:
    adding an aluminum compound chosen from trimethylaluminum, triethylaluminum, tri(n-butyl) aluminum chloride, diethylaluminum chloride, and combinations thereof to said GaCl$_3$ in a container in an Al/Ga molar ratio of from 0.33 to 1, thereby forming a non-corrosive liquid formulation that does not contain free HCl and that comprises at least one of GaMeCl$_2$, GaEtCl$_2$, AlEtCl$_2$, dissolved GaCl$_3$, Ga(n-Bu)Cl$_2$, Al(n-Bu)Cl$_2$, or combinations thereof; and
    storing and/or transporting the liquid formulation in the container.

2. The method of claim 1 wherein the aluminum compound is chosen from triethylaluminum, tri(n-butyl) aluminum chloride, diethylaluminum chloride, and combinations thereof.

3. The method of claim 1 wherein the aluminum compound is triethylaluminum and the Al/Ga molar ratio is 0.5.

4. The method of claim 3 wherein the liquid formulation comprises GaEtCl2 and AlEtCl2.

5. The method of claim 4 wherein the GaEtCl$_2$ is present in an amount of 66 mol % and the AlEtCl$_2$ is present in an amount of 33 mol %.

6. The method of claim 1 wherein the aluminum compound is triethylaluminum and the Al/Ga molar ratio is 0.33.

7. The method of claim 6 wherein the liquid formulation comprises GaEtCl2, AlEtCl2, and dissolved GaCl3.

8. The method of claim 7 wherein the GaEtC2 is present in an amount of 50 mol %, the AlEtCl2 is present in an amount of 25 mol %, and the dissolved GaCl3 is present in an amount of 25 mol %.

9. The method of claim 1 wherein the aluminum compound is tri(n-butyl) aluminum and the Al/Ga molar ratio is 0.33.

10. The method of claim 9 wherein the liquid formulation comprises Ga(n-Bu)Cl2, Al(n-Bu)Cl2, and dissolved GaCl3.

11. The method of claim 10 wherein the Ga(n-Bu)Cl2 is present in an amount of 50 mo1%, the Al(n-Bu)Cl2 is present in an amount of 25 mol %, and the dissolved GaCl3 is present in an amount of 25 mol %.

12. The method of claim 1 wherein the aluminum compound is diethylaluminum chloride and the Al/Ga molar ratio is 1.

13. The method of claim 12 wherein the liquid formulation comprises GaEtCl2 and AlEtCl2.

14. The method of claim 13 wherein the GaEtCl2 is present in an amount of 50 mol % and the AlEtCl2 is present in an amount of 50 mol %.

15. The method of claim 1 wherein the aluminum compound is triethylaluminum and the Al/Ga molar ratio is 0.5.

16. The method of claim 15 wherein the liquid formulation comprises GaEtCl2 and AlEtCl2.

17. The method of claim 16 wherein the GaEtCl2 is present in an amount of 66 mol % and the AlEtCl2 is present in an amount of 33 mol %.

18. A method of producing trialkyl gallium comprising the steps of:
    transporting the container comprising the liquid formulation of claim 1 to a reactor,
    introducing the liquid formulation into the reactor, and
    reacting the liquid formulation with a trialkyl aluminium compound AlR'3 to form trialkyl gallium GaR'3 and dialkyl aluminium chloride Al(R')2Cl, wherein R' is a linear or branched alkyl group with 1 to 8 carbon atoms.

19. A method of preparing trimethyl gallium comprising the steps of:
    transporting the container comprising the liquid formulation of claim 1 to a reactor,
    introducing the liquid formulation into the reactor,
    reacting the liquid formulation and a trialkyl aluminium compound A1R"3 to form a trialkyl gallium GaR"3 and dialkyl aluminium chloride Al(R")2Cl, and subsequently
    reacting the trialkyl gallium GaR"3 with either trimethyl aluminium [Al(CH$_3$)$_3$] or dimethylaluminium chloride [Al(CH$_3$)$_2$Cl] to form the trimethyl gallium,
    wherein R" is a linear or branched alkyl group with 2 to 8 carbon atoms.

20. A method for storing and/or transporting GaCl$_3$, consisting of:
    adding an aluminum compound chosen from trimethylaluminum, triethylaluminum, tri(n-butyl) aluminum chloride, diethylaluminum chloride, and combinations thereof to said GaCl$_3$ in a container in an Al/Ga molar ratio of from 0.33 to 1, thereby forming a non-corrosive liquid formulation that does not contain free HCl and that comprises at least one of $GaMeC_2$, $GaEtCl_2$, $AlEtCl2$, dissolved $GaCl_3$, $Ga(n-Bu)Cl_2$, $Al(n-Bu)Cl_2$, or combinations thereof; and storing and/or transporting the liquid formulation in the container.

\* \* \* \* \*